(12) United States Patent
Shumarayev et al.

(10) Patent No.: US 7,586,983 B1
(45) Date of Patent: Sep. 8, 2009

(54) SYSTEMS AND METHODS FOR OFFSET CANCELLATION IN INTEGRATED TRANSCEIVERS

(75) Inventors: Sergey Shumarayev, Los Altos Hills, CA (US); Wilson Wong, San Francisco, CA (US); Simardeep Maangat, Sunnyvale, CA (US); Thungoc M. Tran, San Jose, CA (US); Tim Tri Hoang, San Jose, CA (US)

(73) Assignee: Altera Corporation, San Jose, CA (US)

( * ) Notice: Subject to any disclaimer, the term of this patent is extended or adjusted under 35 U.S.C. 154(b) by 562 days.

(21) Appl. No.: 11/510,446

(22) Filed: Aug. 24, 2006

Related U.S. Application Data (60) Provisional application No. 60/816,000, filed on Jun. 22, 2006.

(51) Int. Cl.
*H03K 5/159* (2006.01)
*H04B 1/10* (2006.01)
(52) U.S. Cl. ...................... 375/233; 375/350
(58) Field of Classification Search ............... 375/233, 375/350; 708/323; 333/18, 28 R
See application file for complete search history.

(56) References Cited

U.S. PATENT DOCUMENTS 5,872,815 A * 2/1999 Strolle et al. ................ 375/321
7,339,989 B1 * 3/2008 McAdam et al. ............ 375/232
2005/0084046 A1 * 4/2005 Seo ............................ 375/350

OTHER PUBLICATIONS

U.S. Appl. No. 11/192,539, filed Jul. 28, 2005, Shumarayev et al.
U.S. Appl. No. 11/245,581, filed Oct. 6, 2005, Shumarayev et al.
U.S. Appl. No. 11/347,527, filed Feb. 3, 2006, Shumarayev et al.

* cited by examiner

*Primary Examiner*—Don N Vo
(74) *Attorney, Agent, or Firm*—Ropes & Gray LLP; Robert R. Jackson (57) ABSTRACT

In high speed receiver circuitry (e.g., on a programmable logic device (PLD) or the like), decision feedback equalization (DFE) circuitry is used to at least partly cancel unwanted offset (e.g., from other elements of the receiver). The data input to the receiver is tristated; and then each DFE tap coefficient is varied in turn to find coefficient values that are associated with transitions between oscillation and non-oscillation of the receiver output signal. The coefficient values found in this way are used to select trial values. If the output signal of the receiver does not oscillate when these trial values are used, the process is repeated starting from these (or subsequent) trial values until a final set of trial values does allow oscillation of the receiver output signal.

19 Claims, 5 Drawing Sheets

SYSTEMS AND METHODS FOR OFFSET CANCELLATION IN INTEGRATED TRANSCEIVERS

This application claims the benefit of U.S. provisional patent application No. 60/816,000, filed Jun. 22, 2006, which is hereby incorporated by reference herein in its entirety.

BACKGROUND OF THE INVENTION

This invention relates to high speed transceiver circuitry, and more particularly to equalizer circuitry used in such transceivers. Although the term "transceiver" is frequently used herein, the invention is primarily applicable to receiver circuitry or the receiver portion of transceiver circuitry.

High speed transceivers such as those operating at data rates of 3 Gbps and above require complex input equalization schemes to operate effectively. Such equalizers might contain multiple stages used to build a complex transfer function and/or to provide limiting amplification support at the receiver front-end. Because of the increased complexity of equalizers, and because of ever-shrinking circuit fabrication technologies, equalization stages may introduce non-negligible offsets in the signals at their outputs. The offset in an equalizer output signal may result in a shift in the DC value of the output signal. The offset in the output signal may limit the effectiveness of the equalization circuitry by causing errors during the extraction of the data signal from the equalizer input signal. The offset in the output signal may be especially pronounced in circuits in which many equalization stages are connected in series, because the offset of the output signal may increase as the square root of the number of stages cascaded in series in the signal path.

In addition to being sensitive to output signal offset, the performance of high speed transceivers may be affected by a reduced data eye at higher data rates. This can result in detection failure in highly attenuated customer links. The performance of transceivers may further be affected by layout effects, which play an increasing role in deep submicron technology. This can affect the performance of receiver (RX) signal paths and clock data recovery (CDR) phase detectors, compounding offset effects.

Offset cancellation schemes providing apparatus for canceling offset via PLD control have been described in Shumarayev et al. U.S. patent application Ser. No. 11/245,581, filed Oct. 6, 2005, which is hereby incorporated by reference herein in its entirety. The present disclosure provides methods and systems for canceling, minimizing, or compensating for input signal offset using decision feedback equalization (DFE) circuitry included in many receiver equalizers. The present methods and systems rely on DFE circuitry commonly found in receiver equalizers for their functioning. The methods and systems presented herein advantageously provide additional capabilities for eliminating input offset.

SUMMARY OF THE INVENTION

In accordance with this invention, decision feedback equalization (DFE) circuitry that is part of receiver circuitry is used to at least partly cancel or reduce unwanted offset (e.g., from other elements of the receiver). To accomplish this, the data input to the receiver is left undriven (e.g., it is tri-stated). Then a DFE tap coefficient is varied to identify first and second values at which an output signal of the receiver transitions from a first non-oscillatory state to an oscillatory state, and from the oscillatory state to a second non-oscillatory state, respectively. (If the DFE circuitry is multitap DFE circuitry, this is done for each tap in turn.) After the first and second values have been determined, a value intermediate those values is selected. (Again, if the DFE circuitry is multitap, this is done for each tap.) The DFE circuitry is then set using the intermediate tap coefficient value(s). If the receiver output signal oscillates with the DFE circuitry set in this way, the receiver circuit is ready to receive and process an actual data input signal. If the receiver output signal does not oscillate, the operations described above are repeated (preferably starting each iteration from the immediately preceding intermediate value(s)) until a new setting of the DFE circuitry results in a receiver output signal that oscillates.

Further features of the invention, its nature and various advantages, will be more apparent from the accompanying drawings and the following detailed description.

DETAILED DESCRIPTION

The methods and systems for offset cancellation disclosed herein may be especially useful in applications including field programmable gate arrays (FPGAs), programmable logic devices (PLDs), or other reconfigurable or user-configurable circuits. The term PLD is used as a generic term for all integrated circuits of these various kinds. The present methods and systems may rely, for their functioning, on receiver circuitry built into many FPGAs, PLDs, and reconfigurable circuit devices, such as receiver circuitry for high-speed serial interfaces (HSSIs). The present methods and systems may also rely on programmable circuitry and memory to implement the methods described herein.

The methods and systems presented herein provide for dynamic control of offset cancellation. These methods and systems may therefore provide real-time offset cancellation operative to automatically compensate for shifts in the input signal offset and the equalization circuitry offset that may occur during operation. The present methods and circuits make use of properties of DFE systems in order to determine a preferred value of offset cancellation. These methods and circuits may be operative to automatically converge to the preferred value.

Figure 1:
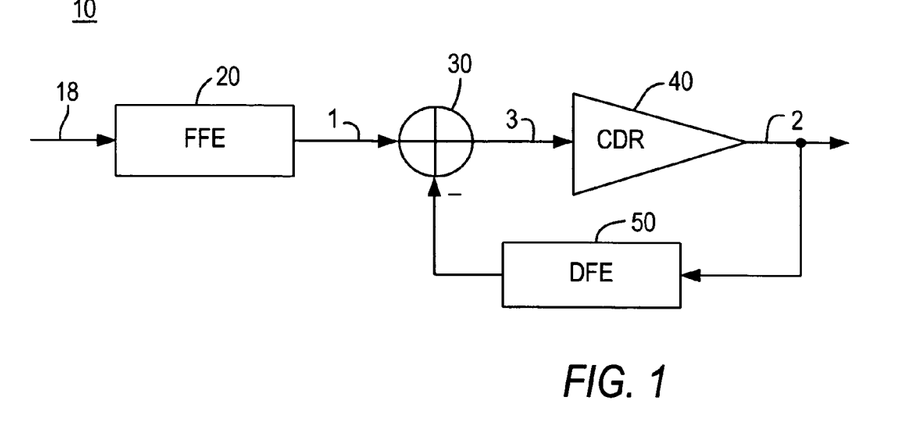
FIG. 1 is a simplified schematic block diagram of an illustrative embodiment of circuitry that can be used in accordance with the invention.

The operation of transceiver circuits may suffer from input signal offset, which may cause errors in the operation of the transceiver. FIG. 1 shows a block diagram of an illustrative transceiver (or at least the receiver portion 10 of such a transceiver) including a feed-forward equalization (FFE) circuit 20, a decision feedback equalization (DFE) circuit 50, and a clock data recovery (CDR) circuit 40. The components shown in FIG. 1 are illustrative, and any of the components shown may be replaced with a different type of component, short circuited, or eliminated. For example, in some embodiments, the CDR circuit 40 of FIG. 1 may be replaced by a comparator or a quantizer. The comparator or quantizer may operate in continuous time or in discrete time. FFE circuit 20 may also be eliminated or replaced by a simple gain stage such as an input buffer. Transceiver circuits that can be used in connection with the invention are described in Shumarayev et al. U.S. patent application Ser. No. 11/347,527, filed Feb. 3, 2006, and in Shumarayev et al. U.S. patent application Ser. No. 11/192,539, filed Jul. 28, 2005, both of which are hereby incorporated by reference herein in their entireties.

In a preferred embodiment, one or more stages of the equalization circuitry may have adjustable or programmable offset. The methods and systems presented herein may be operative to adjust the offset level of one or more stages of the equalization circuitry in order to minimize the offset of the signals in the equalization circuitry. For example, the methods and systems presented herein may be used to cancel or minimize the offset in the signal at the input to the CDR circuit 40 shown in FIG. 1. Minimizing the offset in the signal at the input of the CDR circuit may serve to improve the performance of the equalization circuit, and to minimize the errors made in extracting the data signal from the signal received at the input of the equalization circuit.

In FIG. 1, feed-forward and decision feedback equalizers are combined prior to the CDR front-end. The CDR may function as a phase detector. The phase detector will evaluate the data at its input. In the absence of any input, the data captured by the phase detector will be random with equal probability of zeros and ones. Once the DFE is included into such a system feedback path, as shown in FIG. 1, oscillation can result if there is a gain in the loop.

By way of example, assume that low signal (zero) was detected by the CDR in the presence of no data (the phase detector sense amp would eventually evaluate a no-data case into either zero or one decision, because there are only two states available at the CDR output). This zero would feed into the DFE. DFE 50 will scale zero according to programmed weight and subtract it from the incoming signal (circuitry for providing programmable DFE is described in above-mentioned application Ser. No. 11/347,527). In our assumption there was no signal, hence this subtraction will lead to a signal that is biased toward one. Note that the signal is "biased" because it is not a true one level, but rather a weak one. The strength of the bias depends on the DFE scaling coefficient used. This will result in the phase detector capturing one as the next bit. Now level one is fed back via DFE 50 to be subtracted from "no signal" level at the CDR front-end. The result is zero level captured into the phase detector. The signal at the output of the equalizer will thus oscillate indefinitely.

Figure 2:
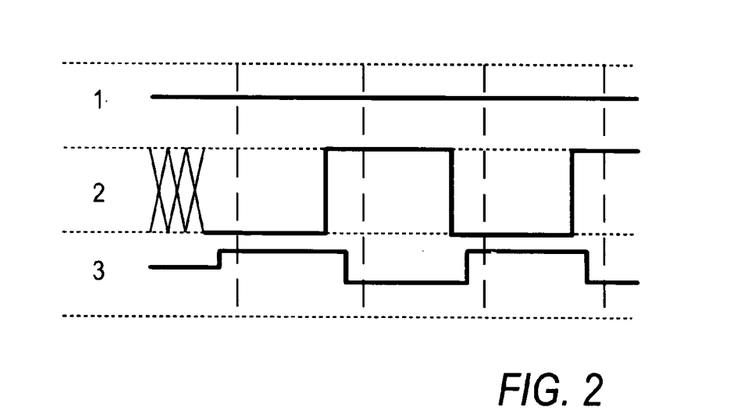
FIG. 2 is a simplified set of representative signals at various points in the FIG. 1 circuitry under certain operating conditions of that circuitry.
Figure 3A:
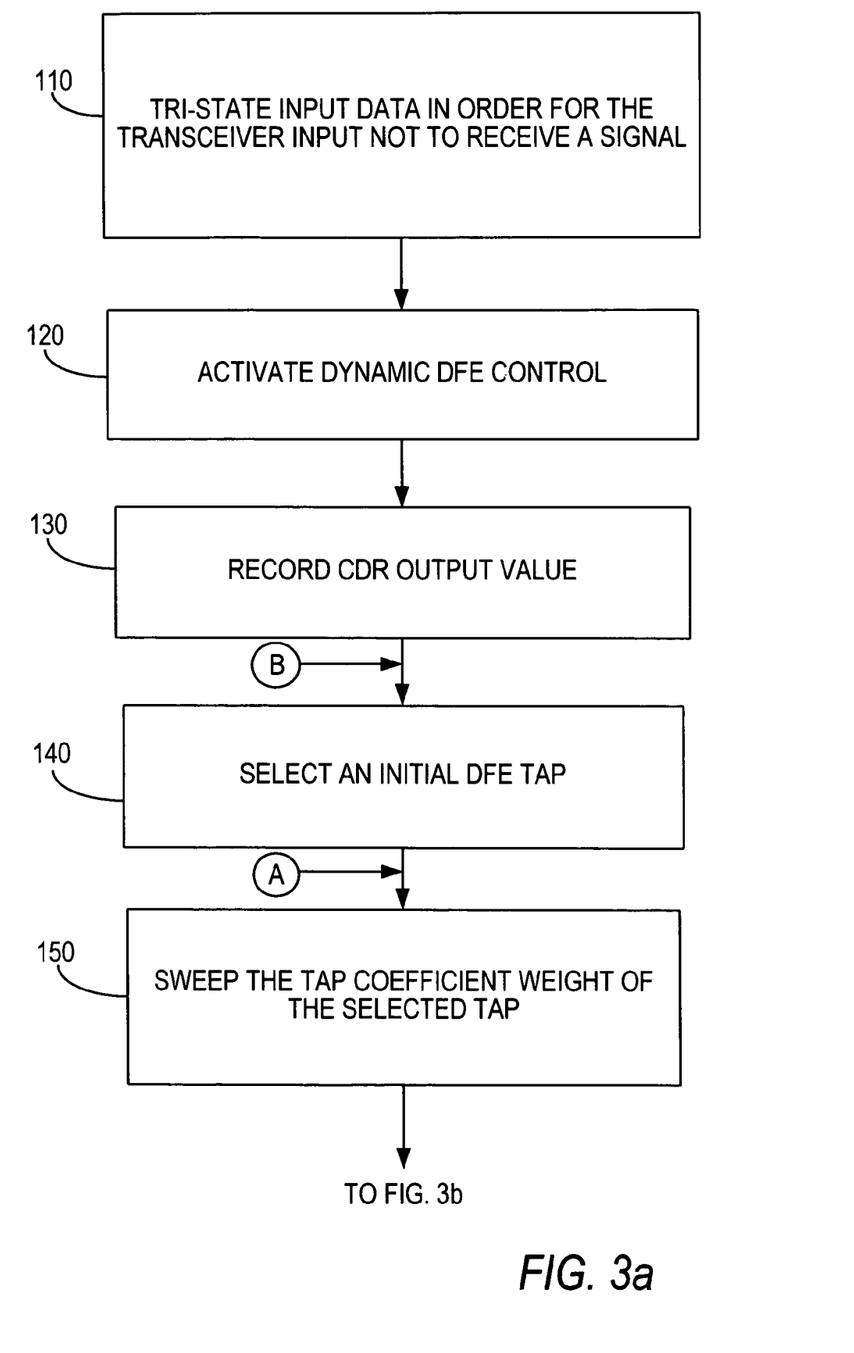
FIGS. 3a-3d are collectively a simplified flow chart of an illustrative embodiment of certain method aspects in accordance with the invention.
Figure 3B:
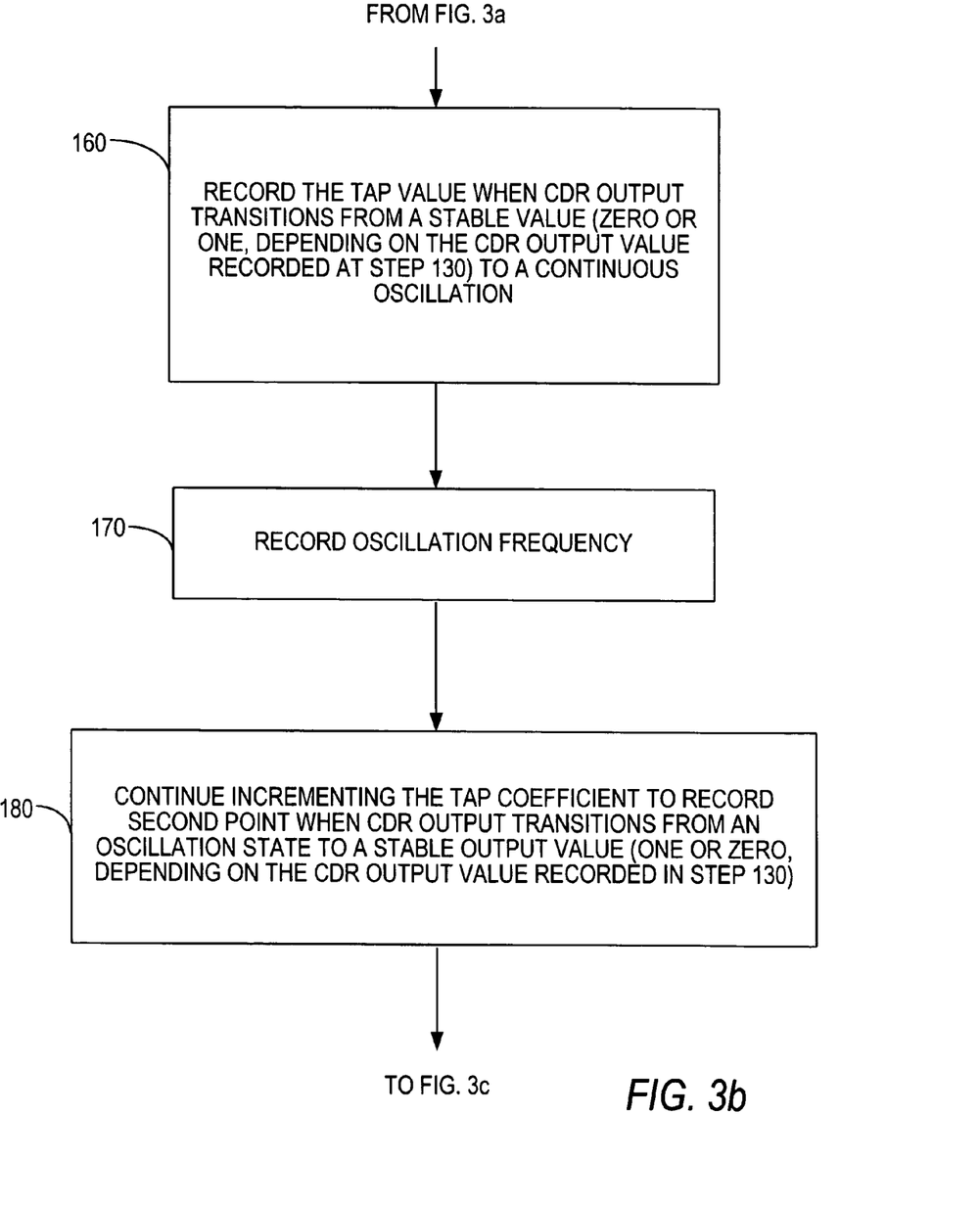
Figure 3C:
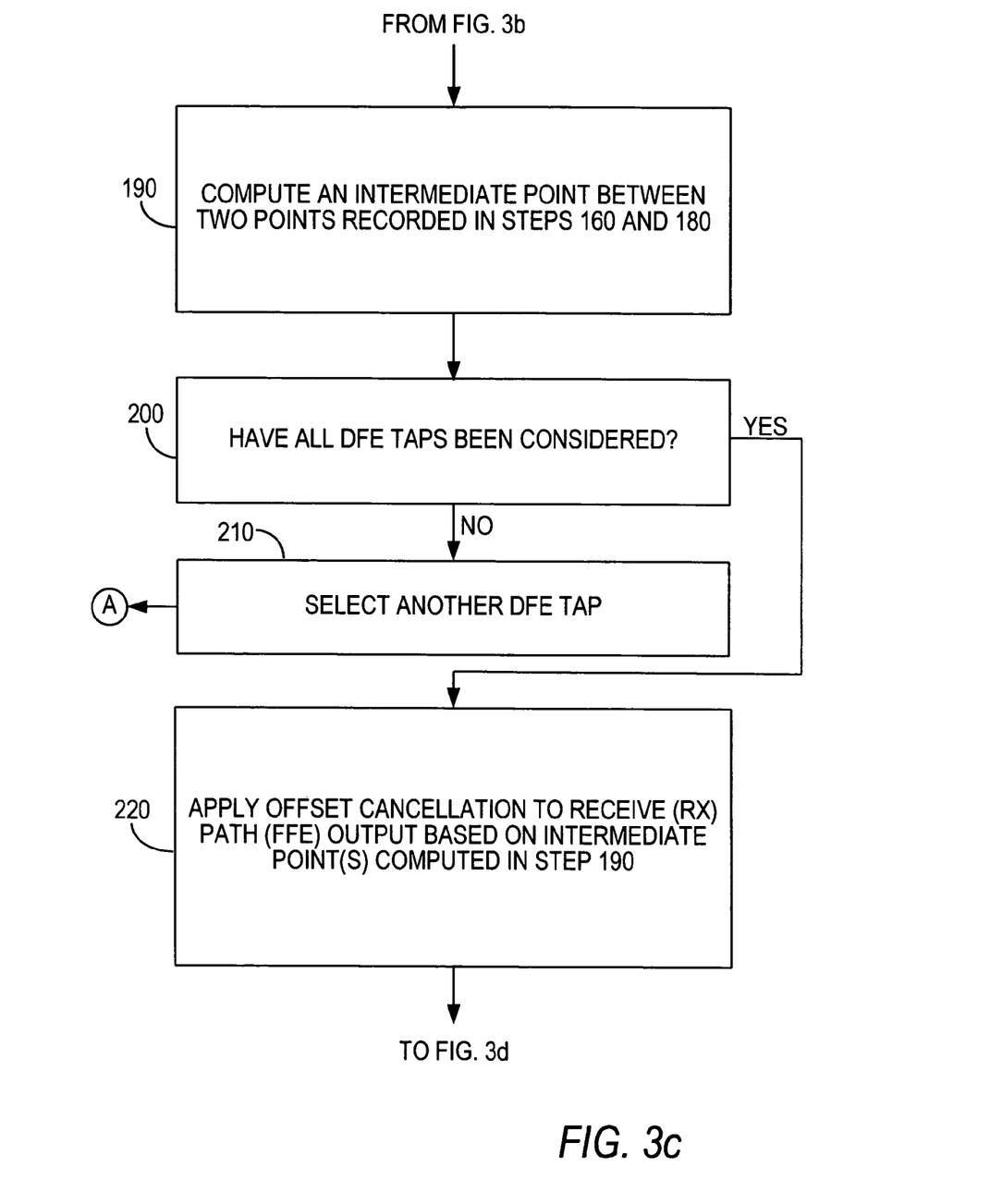
Figure 3D:
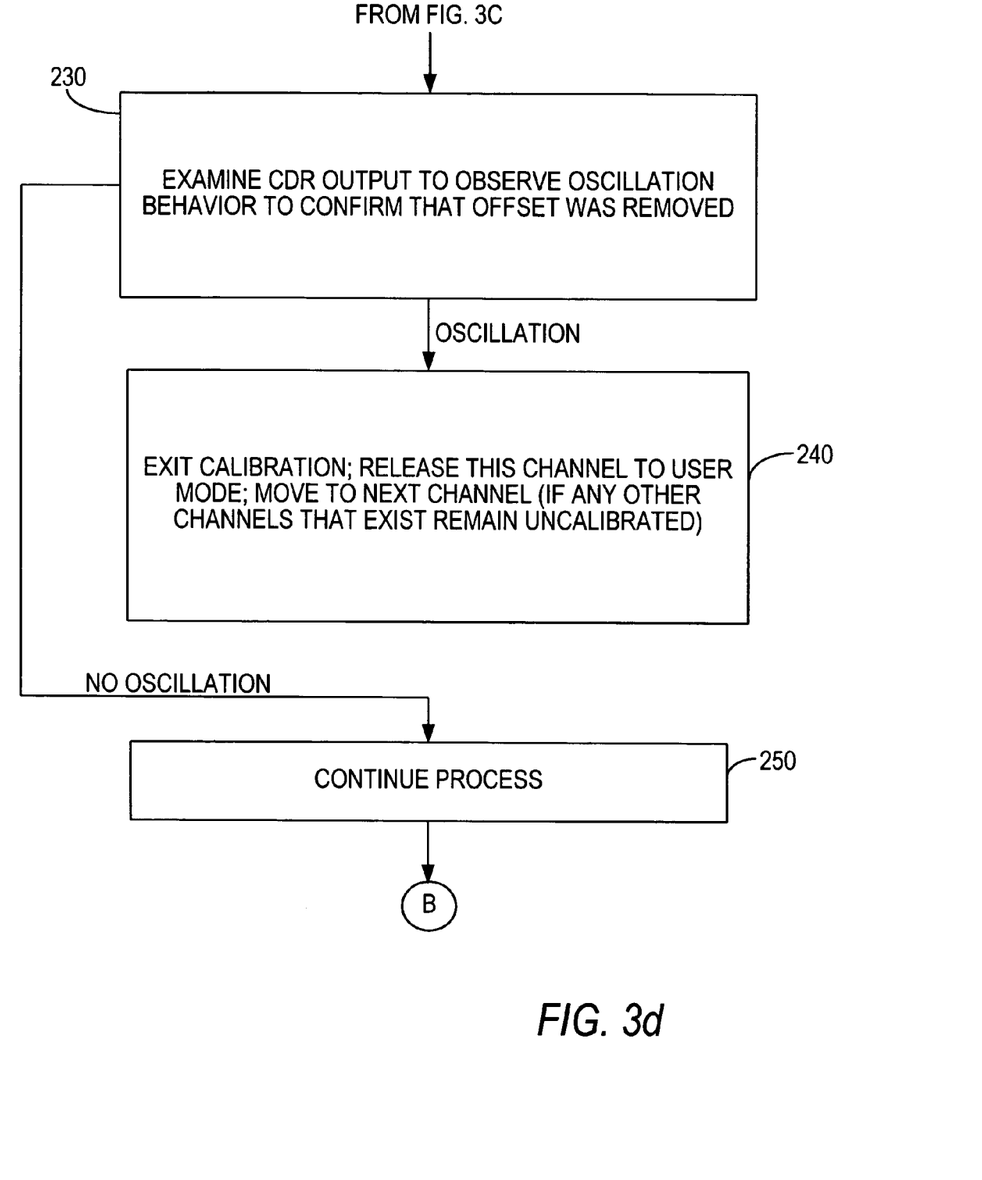

The signal traces in FIG. 2 show illustrative signals at the output of the FFE circuitry (signal 1), at the output of the CDR circuitry (signal 2), and at the input to the CDR circuitry (signal 3). As shown in FIG. 2, the signal at the output of the CDR circuitry (signal 2) may oscillate even though the signal at the output of the FFE circuitry (signal 1) is constant.

When offset is present, for small values of DFE scaling coefficient the oscillation will not occur because subtraction will not be large enough to overpower the amount of offset. Hence CDR output will reside at either zero or one depending on offset sign.

The methods and systems presented herein for offset cancellation rely on determining whether the output signal oscillates or remains constant in response to a constant input signal. In particular, if the output signal does not oscillate, the system may infer that there is offset in the signal. On the other hand, if the output signal oscillates despite the DFE scaling coefficient(s) being of small amplitude, the system may infer that little or no offset exists.

Returning to FIG. 1, this FIG. shows (as had been said) illustrative receiver circuitry 10 of a general type with which the invention can be used. Receiver circuitry 10 may be part of the circuitry of a programmable logic device (PLD) integrated circuit, a field-programmable gate array (FPGA) integrated circuit, or another type of programmable or configurable device or circuit. Receiver circuitry 10 may be replicated several times on the host device. Depicted receiver 10 may therefore be only one representative instance of several receiver channels on the device.

Circuitry 10 includes feed-forward equalization (FFE) circuitry 20, signal combiner circuitry 30, clock and data recovery (CDR) circuitry 40, and decision feedback equalization (DFE) circuitry 50.

In normal use (which may be referred to as user mode), FFE 20 may receive a high speed, serial data input signal via lead 18. FFE circuitry 20 may apply one or more stages of feed-forward equalization to the input signal. FFE 20 outputs the resulting signal on lead 1. The signal on lead 1 may have an offset (e.g., a shift in average DC level imparted to it, e.g., by FFE circuitry 20). Such an offset can interfere with correct further processing of the signal. An offset is therefore undesirable and unwanted.

Signal combiner 30 combines the signal on lead 1 with the output signal of DFE circuitry 50 to produce the signal on lead 3. In particular, combiner 30 subtracts the DFE 50 output signal from the FFE 20 output signal. The resulting signal on lead 3 is applied to CDR circuitry 40.

CDR circuitry 40 recovers a clock signal (recovered clock) and a data signal (retimed or recovered data) from the signal on lead 3. The signal on lead 2 is the retimed or recovered data signal. In addition to being a data output of receiver 10, the signal on lead 2 is fed back to the input of DFE circuitry 50. This circuitry applies DFE to the signal from lead 2 and outputs the result to the subtraction input terminal of combiner 30.

DFE circuitry 50 may be (and typically and preferably is) multitap DFE circuitry. This means that, to produce its output signal, circuitry 50 combines a plurality of samples of signal 2 taken at different times relative to the immediate present. The samples taken at each such different relative time are weighted by a DFE tap coefficient weight or value that is associated with that relative sampling time. A "tap" of DFE circuitry 50 is the internal circuitry for taking samples at a particular relative time and weighting each such sample by the tap coefficient associated with that relative time. For example, weighting may mean multiplying the sample by the appropriate tap coefficient value.

In accordance with this invention, a capability of circuitry 10 is to be able to selectively leave undriven (e.g., by tri-stating) the input 18 to FFE circuitry 20. Another capability of circuitry 10 is to be able to vary the values of the tap coefficients of DFE 50. PLD or other circuitry that is integrated with circuitry 10 may be able to perform such functions as recording the value of receiver output signal 2 at particular times (e.g., whether output signal 2 is logic 0 or logic 1 at a particular time), recording the value of a DFE tap coefficient at a particular time, and/or recording frequency of oscillation (if any) of output 2. Alternatively, some or all of these functions may be performed, in whole or in part, by circuitry external to the integrated circuit that includes circuitry 10. The same is true for other functions such as (1) selectively tri-stating or otherwise leaving lead 18 undriven, (2) varying the DFE tap coefficients, (3) determining whether output 2 is oscillating or stable, and if stable, whether it is logic 0 or logic 1, (4) determining values to be used for the DFE tap coefficients (e.g., initial values, intermediate values, varying values, and the like referred to elsewhere in this specification), and/or (5) generally controlling the progress of the circuitry through the various operations associated with the methods of this invention. In other words, each of these functions may be controlled by circuitry integrated with circuitry 10 (e.g., PLD or similar programmable or configurable circuitry), by circuitry external to such integrated circuitry, or partly by integrated circuitry and partly by external circuitry.

As shown in FIGS. 3a-d, an illustrative method in accordance with the invention begins in step 110 with tri-stating input data signal 18 or otherwise leaving that signal essentially undriven (i.e., neither logic 0 nor logic 1, but essentially floating at some constant or substantially constant level between logic 0 and logic 1).

In step 120 dynamic DFE control is activated. This may include giving the tap coefficients of DFE circuitry 50 some initial values, typically values which cause the output signal of CDR circuitry 40 to be constant at either logic 0 or logic 1.

In step 130 a record is made of the resulting CDR 40 output signal (i.e., whether it is logic 0 or logic 1). This record may be made in the PLD or other generally similar circuitry that is integrated with receiver 10. Alternatively (as noted elsewhere), this record may be made in circuitry that is external to the integrated circuit that includes receiver 10.

Step 140 begins a series of steps that consider each of the taps in DFE circuitry 50, one after another, in turn. In step 140 an initial DFE tap is selected for consideration.

In step 150, the tap coefficient of the selected tap is varied over a range of possible values for that coefficient.

In step 160, when the output signal of CDR 40 ceases to be constant (either logic 0 or logic 1, as previously recorded in step 130) and instead begins to oscillate, the value of the tap coefficient (the one currently being considered) when that transition occurred is recorded. This recording can be done similarly to other above-mentioned recording.

Step 170 may be performed to record the frequency of the oscillation mentioned in the preceding paragraph. Again, this recording can be done similarly to any of the previously mentioned recording.

In step 180 varying of the DFE tap coefficient that is currently being considered continues until the output signal of CDR circuitry 40 transitions from oscillation to a constant value. This constant value should be different than the initial constant value recorded in step 130. For example, if logic 0 was recorded in step 130, the new constant value should be logic 1. If logic 1 was recorded in step 130, the new constant value should be logic 0. The value of the tap coefficient when this transition occurs is recorded as part of step 180. Again, the recording can be done similarly to any previously mentioned recording.

In step 190 an intermediate DFE tap value is computed such that the intermediate value is between the values recorded in steps 160 and 180. For example, the intermediate value may be approximately half-way between the values recorded in steps 160 and 180. This concludes the consideration of the tap whose coefficient is currently being varied. A record is made (e.g., in the PLD that includes the circuitry being calibrated) of the intermediate value just computed in step 190. The tap coefficient being considered is then returned to its initial value in preparation for moving on to consideration of the next tap coefficient. This allows each tap to be examined independently of the tap value found in step 190 for each other tap. (In an illustrative alternative embodiment there can be a cumulative computation, in which one tap coefficient is swept until oscillation occurs. Then that tap coefficient is somewhat reduced and the next tap coefficient is incremented (while keeping the preceding taps at set levels).)

Step 200 is performed to determine whether or not all of the taps of DFE circuitry 50 have now been considered. If not, step 210 is performed to select another tap for consideration, and control then returns to step 150 for consideration of the next tap. If all taps have been considered, control passes from step 200 to step 220.

In step 220 the coefficients of all of the taps in DFE circuitry 50 are set to their respective intermediate values determined in accordance with step 190.

In step 230 the condition of the output signal 2 of CDR circuitry 40 is examined to determine whether it is oscillating (which is desired) or not oscillating (i.e., constant, which is not desired). If CDR output signal 2 is oscillating, control passes from step 230 to step 240. If CDR output signal 2 is not oscillating, control passes from step 230 to step 250.

When step 240 is reached, the process of calibrating DFE circuitry 50 is complete. When the taps of circuitry 50 are set using the intermediate coefficient values determined in accordance with step 190, the DFE circuitry will be effective to at least partly cancel, compensate for, or reduce offset that may be being introduced by other components of receiver 10 (e.g., FFE circuitry 20). Accordingly, step 150 exits the calibration process for the receiver 10 just considered and releases this receiver for user mode operation (i.e., to receive and process an actual data signal that can now be applied via lead 18). If the device includes more than one receiver channel 10, step 240 may also initiate consideration of another as-yet-unconsidered channel. This will result in complete repetition of the steps of FIGS. 3a-d for that other channel.

If step 230 finds that signal 2 is not oscillating, step 250 is performed to try again to find a set of DFE coefficient tap values that will result in oscillation of signal 2 when step 230 is reached again. Step 250 therefore returns control to step 140. However, this time through the succeeding steps the intermediate values from the preceding pass through these steps are used as the initial values for the tap coefficients. The process continues until signal 2 is oscillating when step 230 is reached. Accordingly, the process should eventually result in convergence on a set of values (i.e., the "intermediate values" of step 190) for the DFE tap coefficients that makes DFE circuitry 50 effective to at least partly cancel offset in receiver 10.

The algorithm described above is illustrative of steps that may be used to perform a method for cancelling signal offset in transceivers. The steps of the algorithm may be performed in a different order than that presented. Particular steps may also be eliminated, or other steps introduced into the algorithm, without departing from the invention.

The algorithm can be extended to cover more detailed silicon analyses, for example, during production test and silicon debug. This can be done analyzing:

1. Oscillation frequency for each tap found in basic algorithm; and
2. Difference between phase detector and RX path offset (available after "no oscillation" exit from step 230 in FIGS. 3a-d).

For example, assume that RX offset is known from some other tests (e.g., examining RX buffer output prior to CDR 40 via a specialized loopback test circuit (a commonly provided feature in devices of this general type)). If this known value of offset was set into DFE 50 and oscillation was not detected, then one could infer additional offset in the phase detector and could quantify it by incrementing DFE tap coefficients further until oscillation was found.

It will be understood that the foregoing is only illustrative of the principles of the invention, and that various modifications can be made by those skilled in the art without departing from the scope and spirit of the invention. For example, DFE 50 may have any number of taps for consideration in accordance with the invention.

The invention claimed is:

1. A method of using decision feedback equalization (DFE) circuitry to reduce unwanted offset in receiver circuitry comprising:
   tri-stating a data input signal to the receiver circuitry;
   varying a DFE tap coefficient value to identify first and second values at which an output signal of the receiver circuitry transitions from a first non-oscillatory state to an oscillatory state, and from the oscillatory state to a second non-oscillatory state, respectively; and
   setting the DFE tap coefficient to a value that is intermediate the first and second values.

2. The method defined in claim 1 further comprising:
   after the setting, determining whether the output signal of the receiver circuitry is oscillating, and if so, releasing the receiver circuitry to receive an actual data signal.

3. The method defined in claim 1 wherein the first non-oscillatory state has a different logical level than the second non-oscillatory state.

4. The method defined in claim 1 wherein the intermediate value is approximately midway between the first and second values.

5. The method defined in claim 1 wherein the DFE circuitry includes a plurality of taps, and wherein the varying is performed for each of the taps in turn, after which the setting is performed for all of the taps.

6. The method defined in claim 5 wherein if, after the setting, the output signal of the receiver is not oscillating, the varying and subsequent operations are performed again.

7. The method defined in claim 1 further comprising:
   recording the first and second values.

8. The method defined in claim 1 further comprising:
   recording frequency of the oscillatory state.

9. A method of using multitap decision feedback equalization (DFE) circuitry to at least partly cancel offset in feedforward equalization (FFE) circuitry in a receiver comprising:
   leaving a data input signal to the FFE circuitry undriven;
   for each DFE tap, varying a tap coefficient value to identify a first value at which an output signal of the receiver transitions from a first non-oscillatory state to an oscillatory state and a second value at which the output signal of the receiver transitions from the oscillatory state to a second non-oscillatory state, and then selecting an intermediate value between the first and second values;
   setting the tap coefficients to the intermediate values;
   determining whether the output signal of the receiver is oscillating;
   and if so, then allowing the receiver to receive an actual data input signal; or if not, then repeating the varying and subsequent operations using, during the repeated varying, the previously determined intermediate value for each tap coefficient that is not currently subject to the repeated varying.

10. The method defined in claim 9 wherein the leaving comprises:
    tri-stating the data input signal.

11. The method defined in claim 9 wherein the first non-oscillatory state has a different logical level than the second non-oscillatory state.

12. The method defined in claim 9 wherein the intermediate value for each tap coefficient is approximately midway between the first and second values for that tap coefficient.

13. The method defined in claim 9 further comprising:
    recording the first and second values for each of the tap coefficients.

14. The method defined in claim 9 further comprising:
    recording frequency of the oscillatory state.

15. A method of using multitap decision feedback equalization (DFE) circuitry to at least partly cancel offset in feedforward equalization (FFE) circuitry in receiver circuitry on a programmable logic device (PLD) integrated circuit comprising:
    tri-stating a data input signal to the FFE circuitry;
    initializing the DFE circuitry to cause an output signal of the receiver circuitry to have a first non-oscillatory level;
    for each DFE tap, varying a tap coefficient value to identify a first value at which the output signal transitions from the first non-oscillatory level to oscillation and a second value at which the output signal transitions from oscillation to a second non-oscillatory level, and then selecting an intermediate value between the first and second values;
    setting the tap coefficients to the intermediate values;
    determining whether the output signal is oscillating; and if not, then repeating the varying and subsequent operations using (during the repeated varying) an immediately previously selected intermediate value for each tap coefficient that is not currently subject to the repeated varying until, in a repeated determining, the output signal is oscillating.

16. The method defined in claim 15 wherein the first and second non-oscillatory levels have respective different logical values.

17. The method defined in claim 15 wherein the intermediate value for each tap coefficient is approximately midway between the first and second values for that tap coefficient.

18. The method defined in claim 15 further comprising:
    recording the first and second values for each of the tap coefficients in the PLD.

19. The method defined in claim 15 further comprising:
    recording frequency of the oscillation in the PLD.

* * * * *

UNITED STATES PATENT AND TRADEMARK OFFICE
CERTIFICATE OF CORRECTION

PATENT NO. : 7,586,983 B1  Page 1 of 1
APPLICATION NO. : 11/510446
DATED : September 8, 2009
INVENTOR(S) : Shumarayev et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 577 days.

Signed and Sealed this

Twenty-first Day of September, 2010

David J. Kappos
*Director of the United States Patent and Trademark Office*